United States Patent [19]

Newstead et al.

[11] Patent Number: 4,939,522

[45] Date of Patent: Jul. 3, 1990

[54] METHOD AND SYSTEM FOR MONITORING VEHICLE LOCATION

[75] Inventors: Dennis P. Newstead, Dyfed, Wales; Colin J. Whitehead, Trowbridge, England

[73] Assignee: Bechtel Group, Inc., San Francisco, Calif.

[21] Appl. No.: 351,910

[22] Filed: May 15, 1989

[51] Int. Cl.$^5$ .............................................. G01S 1/24
[52] U.S. Cl. ..................................... 342/387; 342/457; 342/398
[58] Field of Search ............... 342/457, 386, 387, 398, 342/407, 408

[56] References Cited

U.S. PATENT DOCUMENTS

| | | | |
|---|---|---|---|
| H288 | 6/1987 | Gutleber | 342/367 |
| 31,962 | 7/1885 | Brodeur | 343/389 |
| 3,922,677 | 11/1975 | Tomkewitsch et al. | 343/112 R |
| 4,305,077 | 12/1981 | Tsumura | 343/112 R |
| 4,319,243 | 3/1982 | Vachenauer et al. | 343/6.5 R |
| 4,533,871 | 8/1985 | Boetzkes | 324/207 |

FOREIGN PATENT DOCUMENTS 1575397 9/1980 United Kingdom .

Primary Examiner—Theodore M. Blum
Attorney, Agent, or Firm—Townsend and Townsend

[57] ABSTRACT

Multiple vehicles located within a predefined search space are located and tracked using at least two spaced-apart transmitters. Each transmitter can broadcast an omnidirectional initialization signal and a positioning signal having a null or break in its wavefront. By rotating the positioning signal, the null will sweep the predefined search space and by detecting both the initialization signal and the null in the positioning signal, the position of each vehicle can be determined. In the preferred embodiment, the locational information from each vehicle is collected at a central location, typically in a data acquisition system or controller. In the particularly preferred embodiment, the locational information is further relied on to provide for command information for feedback control of the vehicles.

14 Claims, 2 Drawing Sheets

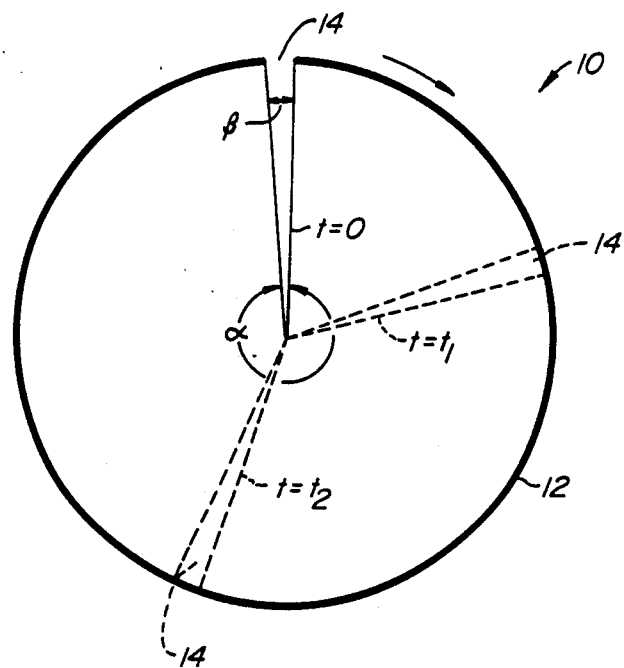
FIG._1.

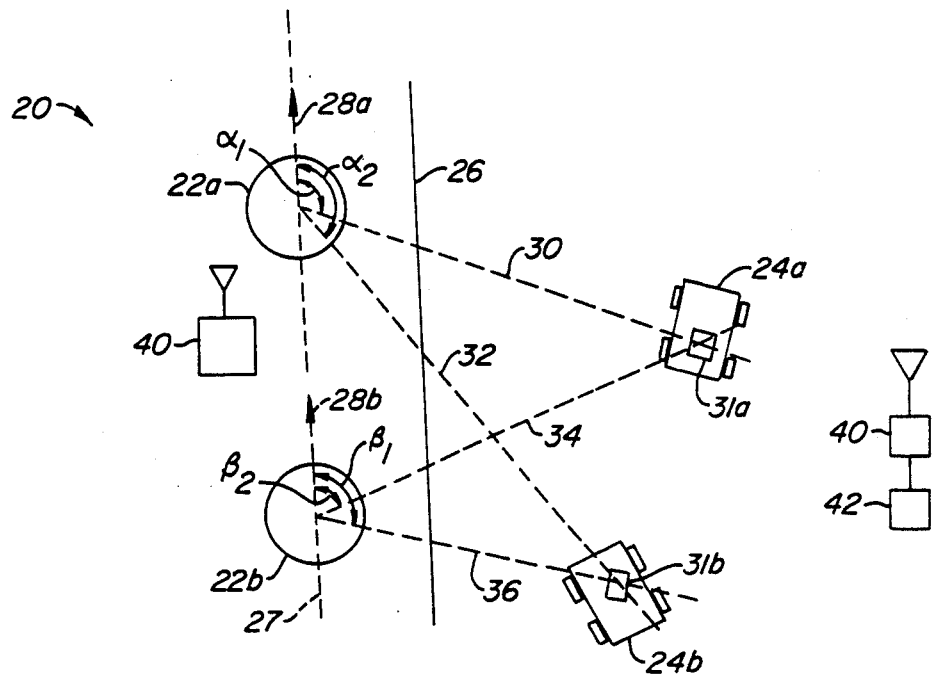
FIG._2.
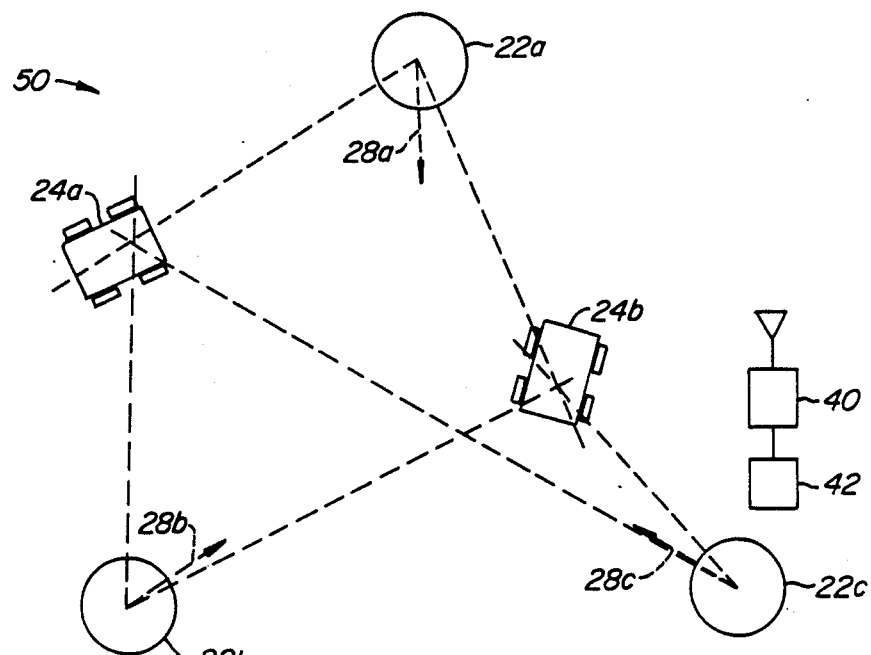
FIG._3.

METHOD AND SYSTEM FOR MONITORING VEHICLE LOCATION

BACKGROUND OF THE INVENTION

1. Field of the Invention

The present invention relates generally to a system and method for locating moving objects in a field crowded with such objects. More particularly, the invention relates to determining location based on the transmission of reference signals from at least two spaced-apart locations, reception of the signals by each of the moving objects, and interpretation of the reference signals to determine the bearings of each of the transmission locations relative to the moving objects.

The ability to locate and track moving objects in a crowded field is of concern in a number of applications, including aircraft control, vehicular control in urban areas, and control of transportation vehicles in facilities such as open pit mines, warehouses, airports, and the like. Conventional systems, such as radar, usually rely on human observation and interpretation of a visual display. While effective in many circumstances, systems which require human interpretation suffer from a number of drawbacks. The number of objects which may be tracked is limited. The accuracy of the positional determinations is not high. Finally, the information discerned by the human operator is not easily stored and manipulated using computers and other automatic data processing techniques.

To supplement radar, a variety of navigational systems, such as LORAN A, LORAN C, OMEGA, and Decca, have been developed to assist in long range navigation of ships and planes. Such systems generally rely on broadcast of locational signals from a number of fixed points and determination of position based on conventional triangulation calculations. While such systems are very effective for providing navigational assistance, they do not generally allow for central compilation of locational data on a large number of planes and ships. Moreover, even when such systems are modified with transponders on the vehicles to provide for central collection of data, the systems are not highly accurate and are generally unsuitable for surface vehicular control in relatively small areas, such as individual cities, airports, and other facilities.

For the above reasons, it would be desirable to provide a method and system for locating the positions of moving objects with high accuracy, such as q1 foot or better. It is further desirable that such systems would be effective over relatively small areas, such as the area of a city or individual facility, and that the system could locate and track hundreds and even thousands of moving objects simultaneously. Finally, it would be desirable if the system were digitally controlled and able to interface with control systems whereby the control system would be capable of directly controlling the movement and positions of the various moving objects.

2. Description of the Background Art

U.S. Pat. No. Re. 31,962 describes a LORAN-C navigational system which utilizes a plurality of fixed broadcast stations which transmit synchronized, pulsed low-frequency signals. A ship or plane receives signals from at least three of the fixed stations, and can calculate position based on the phase shift between the signals.

U.S. Pat. No. 4,305,077 describes a navigational system which relies on only a single ground reference station which transmits three signals: a scanning signal, a positional information signal, and an azimuth information signal. Each vehicle includes receivers for the various signals, and the position may be calculated based on the time or phase shift between the receipt of the omnidirectional azimuth information signal and the unidirectional scanning signal.

U.S. Pat. No. 4,319,243 describes a system for controlling aircraft in the immediate locality of an airport. The system includes a focus beam transmitter and a focused receiver, each of which scans the field. Each aircraft or other airport vehicle includes a transponder which broadcasts only when interrogated by the focused beam. The position of each aircraft and vehicle is determined at the moment when the aircraft is interrogated by the focus beam and the transponder signal is received by the focus receiver. See also U.S. Pat. Nos. 3,922,677 and 4,533,871, which relate to systems for locating surface vehicles.

United Kingdom Pat. No. 1,575,397 of Standard Telephones and Cables, Ltd., describes a Radio Lighthouse for marine navigation. Therein a system is described for transmitting bearing information wherein frequency- and time-specific binary coded signals and amplitude modulated Morse Code groups are employed for identifying the transmitter and certain bearing information. The system relies on logic timers to decode information imbedded in the signal format. VHF signals are employed.

What is needed is a vehicle tracking system capable of accurately pinpointing a plurality of vehicles within a predefined space from a remote location.

SUMMARY OF THE INVENTION

The present invention is a method and system for locating and tracking moving objects within a predefined space, usually a two-dimensional space by it relying on the detection of a break or null in a substantially continuous transmission of a sweeping transmission signal, rather than on the detection of a discrete signal subject to interference. This invention is particularly useful in areas subject to radio transmission interference, such as multipath interference arising from radio transmission reflections from the moving objects themselves as well as other objects, such as stationary structures.

The system of the present invention includes at least two spaced-apart transmitters capable of broadcasting both an initialization signal and a positioning signal. The initialization signal marks the beginning of a time period during which a null or a gap in the positioning signal is swept across the predefined space. Each moving object includes a receiver capable of detecting both the initialization signal and the positioning signal, and the bearing of the object relative to each transmitter is determined by measuring the elapsed time between the initialization signal and the detection of the transmission null in the positioning signal. By determining the relative bearing for at least two and preferably three transmitters, the precise location of each moving object within the predefined space can be determined.

In the preferred embodiment, transponders within each of the moving objects will transmit the locational information to a central controller or data acquisition system which can simultaneously track the movement of all of the moving objects. In a particularly preferred embodiment, the central controller can communicate back to each of the objects in order to control their motion to some degree.

The positioning signal is transmitted over an arc approaching 360x, leaving a blank or null transmission over a very small arc, typically less than 1x. By rotating the positioning signal transmission with the null beginning at a known bearing, it is possible for each moving object, with appropriate on-board computation equipment, to determine its bearing relative to each transmitter by measuring the time elapsed from the commencement of the positioning signal (which coincides with the initialization signal) until the null in the positioning signal is detected.

In the simplest embodiment, two transmitters will be employed. Two transmitters are sufficient to locate any object in a plane surrounding the transmitters, so long as the objects do not lie along a line defined by the two transmitters themselves. Thus, the two transmitter embodiment will normally be employed by placing the transmitters outside of the space where the objects will be found. By employing a third transmitter, the set of transmitters may be placed within the predefined space with the objects being locatable at any point therein. In some cases, it may be desirable to locate objects within a three-dimensional space. In that case, an additional transmitter broadcasting in a plane normal to the broadcast plane of the first two transmitters will be required.

BRIEF DESCRIPTION OF THE DRAWINGS

FIG. 1 is a schematic illustration of the positioning signal in one position in its sweep having a break or null in transmission utilized in the present invention.

FIG. 2 is a schematic drawing illustrating a first embodiment of the present invention employing two transmitters.

FIG. 3 is a schematic drawing illustrating a second embodiment of the present invention employing three transmitters.

DESCRIPTION OF THE PREFERRED EMBODIMENTS

According to the present invention, a system for locating movable objects in a predefined space comprises: (1) at least two transmitters each capable of transmitting an initialization signal and a positioning signal; and (2) receivers on each of the movable objects for detecting both types of signals. The initialization signal is generally an omnidirectional broadcast over the entire space of interest and indicates commencement of the positioning signal. The positioning signal, in contrast, is directional and includes a detectable null or blank in the transmission pattern, which null is swept around the space of interest at a predetermined and constant angular velocity. The position of each of the moving objects may thus be determined relative to each of the transmitters by measuring the elapsed time between detection of the initialization signal and detection of the null in the positioning signal. The system including the components just describes provides sufficient information to each of the movable objects to allow determination of its particular location in the predefined space.

In some cases, it will be necessary or desirable to compile the locational information on all or some of the movable objects at a central location. In that case, each of the movable objects will include a transponder capable of communicating with a central controller or data acquisition system. In many cases, it will be further desirable to provide capability for the central controller to actively control the movement of some or all of the movable objects. In such cases, it will be necessary to provide a further transmitter associated with the central controller for broadcasting control signals to the movable objects. Each of the movable objects, of course, will have to have the ability to receive the control signals and translate such control signals into a desired control action, as for example, steering, acceleration, deceleration, and the like.

The present invention is applicable in a wide variety of situations where a plurality of surface vehicles, aircraft, or the like, are present in a relatively small area, such as an airport runway and tarmac, an airport passenger loading area and lobby, an open pit mine, a warehouse, a city, or the like. The system allows for the highly accurate tracking of hundreds or even thousands of such vehicles in a confined space and facilitates collision avoidance, recording of movements, and in some cases optimal control of the vehicles. Reliance on detecting the null or break in the positioning signal is particularly well suited for operation in crowded environments where the presence of multiple vehicles would be expected to cause signal interference, such as multipath propagation of broadcast signals.

Referring to FIG. 1, the positioning signal 10 of the present invention consists of a substantially continuous wavefront 12 having a small null or break 14 therein. The wavefront 12 spans an arc ' (alpha) approaching 360x, while the null 14 spans an arc a (beta) of less than 5x, usually less than 2x, preferably less than 1x.

The transmitted wavefront 12 of the positioning signal 10 may be continuous or modulated, preferably being modulated. The advantage of modulating the wavefront 12 of the positioning signal 10 is twofold. First, modulation can serve as a timer, informing a receiver in each moving object of the elapsed time from the initialization signal. The use of a pulsated positioning signal as the form of modulation would be adequate for this purpose. As an alternative to reliance on a pulsated transmission, each receiver can include an internal timing mechanism to provide for measurement of elapsed time between the initialization signal and detection of the null in the positioning signal.

Modulation of the wavefront 12 of the positioning signal 10 also enhances the ability of the receivers in the moving objects to detect and center the null 14. Once substantial interference exists in the space of interest, reception of the positioning signal can be substantially degraded. Under such circumstances, the beginning and termination of the null 14 will not always be precisely detectable. By encoding a particular pattern in the wavefront 12, however, the ability of a receiver to detect the null 14 can be improved. For example, using a pulsed signal, the receiver can detect the instant that each pulse is received Even though the reception of individual pulses may be degraded, the receiver can follow the overall pattern of the pulses, enhancing the ability to detect the precise instants when the null in transmission commences and terminates. The frequency of the pulses, of course, will have to be much greater than the time period of the null 14, but this will normally be no problem. As described in more detail hereinbelow, the positioning signal 10 is typically rotated over a period of about 3/10 of a second, corresponding to a null pulsewidth of about 1 millisecond for a gap of approximately 1x. The modulating pulses should thus be encoded at a much higher frequency, typically at least about 10,000 Hz, more typical 100,000 Hz or higher.

The broadcast pattern 10 sweeps or is rotable so that the null 14 appears to move around the wavefront 12 at a constant angular velocity. Thus, assuming that the null 14 is in the position illustrated in full line at t=0, the null will have moved to an angularly displaced position shown in broken line at $t=t_1$. At $t=t_2$, the null 14 will have been further angularly displaced to the second position illustrated in broken line.

A wide variety of transmitters and antenna systems are available for broadcasting the transmission pattern illustrated in FIG. 1. A typical transmitter provides output in the range of 750 MHz to 1 Ghz with 500 mW effective radiated power (ERP) to phase-variable dual-driven arrays or to a mechanical equivalent transmitting antenna, to provide a rotating horizontal planar polar pattern (or so-called pseudo-cardioid pattern). Another typical transmitter/antenna arrangement, two dual solid angle cones are disposed in transverse relationship so that the axes of the cone pairs produce an interference pattern with a null in the radiation pattern of the desired angular width. A transmitting arrangement of this type would typically be used to produce several nulls at equal angular displacement, as the pattern would not be truly omnidirectional. A sweep rate adjusted accordingly should produce substantially the same detectable signal.

In each case, the radiation pattern is preferably vertically polarized for the reasons explained below.

Referring now to FIG. 2, a first embodiment 20 of the system of the present invention includes a pair of transmitters 22 (22a and 22b) located at fixed positions and spaced apart from one another. Moving objects, illustrated as vehicles 24 (24a and 24b), are located within a predefined search area located to the right of a boundary line 26. Boundary line 26 is parallel to an imaginary line 27 joining the transmitters 22, and so long as vehicles 24 remain to the right of boundary line 26, and within the range of transmitters 22, their positions may be located with the system 20.

System 20 begins operation with a first transmitter 22a broadcasting an omnidirectional initialization signal over the search area, and specifically to the right of the boundary line 26. Conveniently, the initialization signal may be encoded at the beginning of the positioning signal and may include information such as the identity and location of the transmitter. The null 14 in the positioning signal is initially oriented in the direction of arrow 28a and begins to the right of boundary 26 rotating clockwise to enter the predefined search area almost immediately. The null 14 will traverse the search area in a clockwise direction until it reaches the position indicated by line 30, at which time the null will be detected by a first receiver 31a in vehicle 24a. The first receiver 31a includes means for storing the elapsed time between detection of the initialization signal and detection of the null, and the receiver 31a will store such information for later use. The null 14 in the first positioning signal from first transmitter 22a will continue sweeping in a clockwise direction until it reaches the position indicated by line 32, at which time the null is detected by a second receiver 31b in vehicle 24b. The receiver 31b in vehicle 24b will also store the elapsed time between detection of the initialization signal and detection of the null in an internal storing means.

After the null 14 of transmitter 22a has completed a single 180x sweep (or up to 180x) of the search area, transmission from the first transmitter 22a is terminated, and transmission from the second transmitter 22b is commenced. Null 14 of transmitter 22b is initially oriented in the direction of arrow 28b, and rotation is commenced in the clockwise direction after an initialization signal is transmitted. The null 14 from transmitter 22b is first detected by the receiver 31a in vehicle 24a when it reaches the position indicated by line 34, and the elapsed time between detection of the initialization signal and detection of the null is stored. At this point, the receiver 31a and any associated calculator in vehicle 24a has sufficient information to determine its position relative to the transmitters 22a and 22b. Specifically, the first elapsed time detected by the receiver allows calculation of an angle $'_1$ based on the predetermined known angular velocity of rotation of the null 14 in the wavefront from transmitter 22a. Similarly an angle $a_1$ may be determined to line 34 based on the second elapsed time measured by the receiver 31a and the associated calculator. Knowing the angles $'_1$ and $a_1$ allows the calculation of position of the vehicle 24a relative to the transmitters 22a and 22b by simple triangulation. As the position of the transmitters 22 are known, the position of the vehicle 24a within the search area may be determined within the accuracy of the resolution of two measured angles at a distance from the transmitters 22.

Determination of the position of vehicle 24b is made in an analogous manner, angles $'_2$ and $a_2$ to lines 32 and 36 being calculated based on the elapsed times observed by the receiver in vehicle 24b. Using the method just described, the locations of a virtually unlimited number of vehicles in the search area may be determined.

The system 20 of FIG. 2 may also include a central receiver 40 which operates in conjunction with a controller and data acquisition system 42. A data acquisition system is used to provide central recording and display for the positions of the multiple vehicles in the search areas. The addition of a controller would allow central control of the motion of the various vehicles. Such a controller broadcasts control signals to various vehicles equipped with additional receivers, for detecting such control signals, and equipped with actuation systems for effecting control of the vehicle steering, acceleration, deceleration, and the like.

The system 20 of FIG. 2 contemplates that the transmitters 22a and 22b will operate on a common frequency, but at different times, with cycling of the two transmitters occurring preferably at least once per second. It would, of course, be possible to operate the transmitters 22a and 22b simultaneously at different frequencies in conjunction with receivers capable of receiving at the different frequencies. For most applications, it will be unnecessary to operate the transmitters simultaneously since locational information received on the order of every second will be sufficient to provide the desired data.

Referring now to FIG. 3, a second embodiment 50 of the system of the present invention includes three transmitters 22a, 22b and 22c. Operation of the system 50 is analogous to that of the system 20 in FIG. 2, except that the use of three transmitters allows operation over a search area limited only by the broadcast reach of the transmitters. (The boundary line 26 in system 20 was necessitated by the inability of two transmitters 22 to distinguish the location of a vehicle passing over the line 27 joining them). The use of three transmitters avoids this problem, since the third transmitter will always be able to locate a vehicle 24a or 24a which may be positioned along a line between the other two transmitters.

Although the foregoing invention has been described in some detail by way of illustration and example for purposes of clarity of understanding, it will be obvious that certain changes and modifications may be practiced within the scope of the appended claims. For example, the invention may be generalized into three dimensions by addition of a suitable sweep signal in azimuth in connection with the horizontal planar sweep contemplated by the embodiments herein described. Therefore, it is not intended that the invention be limited, except as indicated by the appended claims.

What is claimed is:

1. A method for locating mobile objects within a predetermined search space, said method comprising:
   transmitting at least two reference transmissions from spaced-apart locations, each transmission including (1) an omnidirectional initialization signal followed by (2) a positioning signal having a sweeping null;
   each said mobile object receiving the reference transmissions and measuring elapsed time between detection of the initialization signal and detection of the null in the positioning signal, said elapsed time corresponding to the relative angle between the location of the transmission and the object; and
   determining the position of each object based on comparison of each said relative angle.

2. A method as in claim 1, wherein the reference transmissions are transmitted by a pair of antennas generating an interference pattern.

3. A method as in claim 1, wherein the positioning signal is pulsated and the elapsed time between the initialization signal and the null is determined by counting pulses.

4. A method as in claim 1, wherein the initialization signal contains information concerning the location from which the reference transmission emanates.

5. A method as in claim 1, wherein the locations of the reference transmissions are fixed within the predetermined search space.

6. A method as in claim 1, wherein the locations of the reference transmissions are fixed outside of the predetermined search space.

7. A method as in claim 1, wherein the predefined search space is planar.

8. A method as in claim 1, wherein the predefined space is three-dimensional, and at least two reference transmission are transmitted along a first plane in the space and at least one additional reference transmission is transmitted along a second plane which is normal to the first plane.

9. A method as in claim 1, further including the step of transmitting a control signal to each mobile object based on positions which have been determined.

10. A system for locating mobile objects within a predefined space, said system comprising:
    at least two spaced-apart transmitters, each transmitter capable of transmitting a reference transmission including (1) an omnidirectional initialization signal followed by (2) a positioning signal having a sweeping null;
    a receiver on each mobile object capable of receiving the reference transmissions and measuring the elapsed time between the initialization signal and the null in the positioning signal, said elapsed time corresponding to the relative angle between the transmitter and the object; and
    means for determining the position of each object based on each said relative angle between the object and the transmitters.

11. A system as in claim 10, further including means transmitting a control signal to each mobile object based on positions which have been determined, said control signal for instructing said mobile object to take an action.

12. A system as in claim 10, wherein said transmitters each include a pair of antennas capable of generating an interference pattern.

13. A system as in claim 10, further including a transponder on at least some of the mobile objects, and a central receiver for receiving signals from said transponder, said signals relating to the positions of said objects.

14. A system as in claim 13, further including a central controller capable of receiving locational information from the central receiver and broadcasting control information to the mobile objects, wherein each mobile object further includes a receiver for receiving the control information and means for controlling the motion of the vehicle in response to the control information.

* * * * *